United States Patent [19]

Kowalchuk

[11] 4,432,263
[45] Feb. 21, 1984

[54] DUPLICATING FENCE FOR ATTACHMENT TO A RIP SAW FENCE OF A TABLE SAW

[76] Inventor: Paul G. Kowalchuk, 680 Agnew St., S6V 2P1 Prince Albert, Sask., Canada

[21] Appl. No.: 427,182

[22] Filed: Sep. 29, 1982

[51] Int. Cl.³ .............................................. B27B 27/02
[52] U.S. Cl. ..................................... 83/438; 83/440.2; 83/467 R; 83/522
[58] Field of Search ....................... 83/467, 468, 435.1, 83/477.2, 438, 522, 431, 418, 420, 422, 440.2; 269/318

[56] References Cited

U.S. PATENT DOCUMENTS

| | | | |
|---|---|---|---|
| 2,522,965 | 9/1950 | Schaufelberger | 83/431 X |
| 2,985,202 | 5/1961 | Wilson | 83/431 |
| 3,808,932 | 5/1974 | Russell | 83/440.2 X |
| 4,002,329 | 1/1977 | Petrowski | 83/467 X |
| 4,026,173 | 5/1977 | Livick | 83/438 X |
| 4,399,728 | 8/1983 | Davis | 83/438 X |

Primary Examiner—Donald R. Schran

Attorney, Agent, or Firm—Frishauf, Holtz, Goodman & Woodward

[57] ABSTRACT

This invention relates to a duplicating fence for use as an attachment to a rip saw fence of a table saw of the type which includes a table top and circular saw extending upwardly therethrough. A backing member which has a vertical and straight rear wall portion abuts the face of a rip saw fence opposite the circular saw. An elongate guide member extends outwardly from the backing member in a direction towards the saw blade and at its free end longitudinally aligned with the saw blade includes an elongate and straight vertical side edge portion which is parallel to the rear wall portion and perpendicular to a bottom edge portion of the backing member. Means are provided for attaching and supporting the rear wall portion of the backing member to the rip saw fence and for supporting the side edge portion of the guide member in a horizontal plane above the circular saw. Using a straight edge or pattern fastened over a work piece and which abuts the vertical side edge portion of the guide member, it is possible to readily duplicate awkward shapes, produce simple and compound mitres, chamfers, tapers and the like.

8 Claims, 3 Drawing Figures

DUPLICATING FENCE FOR ATTACHMENT TO A RIP SAW FENCE OF A TABLE SAW

BACKGROUND OF INVENTION

Conventional table saws which invariably include a rip saw fence are not always conducive to many cutting operations such as truing an edge, duplicating awkward shapes, champfering and producing simple and compound mitres which often is made more difficult where large work pieces are involved. Indeed, in some cutting operations, numerous repetitive mitre gage settings may be required resulting in possible inaccuracies in the overall finished product and further, large work pieces may not permit the use of a mitre gage at all. Additionally, in chamfer operations, different widths and lengths of stock may necessitate the resetting of the rip saw fence or the use of a stopping device on a mitre gage.

Because of the foregoing, there has been a need for an attachment such as the duplicating fence of my invention which imparts to the overall operation of a table saw improved or extended versatility in many cutting operations.

SUMMARY OF INVENTION

My novel duplicating fence is as above indicated intended to be used as an attachment to a rip saw fence of a table saw that has a table top and a circular saw extending upwardly therethrough. It comprises, in combination, a backing member which includes an elongate and straight horizontal bottom edge portion and a vertical and straight rear wall portion. The bottom edge portion is designed to abut the table top of the table saw whilst the rear wall portion abuts the rip saw fence in a vertical plane. A guide member is disposed on a side of the backing member opposite the rear wall portion thereof and which extends outwardly therefrom. This guide member also includes an elongate and straight vertical side edge portion which is parallel the rear wall portion and perpendicular to the bottom edge portion of the backing member. Attaching and supporting means is also included for fixedly attaching the rear wall portion of the backing member to the rip saw fence and for supporting the side edge portion of the guide member in a horizontal plane above the circular saw. The duplicating fence can itself be constructed from any suitable material, such as metal, wood or plastic.

In one embodiment of my invention, the duplicating fence can also include adjustable locking means which cooperates with both the backing member and the guide member so that the latter, relative to the bottom edge portion of the backing member can be raised and lowered. As the guide member is normally intended to be positioned above the circular saw, this raising and lowering feature permits guide member adjustment commensurate with the height of the circular saw above the table top.

In accordance with yet another aspect of my invention, provision can be made for positioning a saw guard on the duplicating fence itself since the existing saw guard or shield of a table saw must first be removed before my novel device is used and as the circular saw is positioned below the guide member for most of the cutting operations, it alone affords virtually complete protection for fingers, hands or debris which falls unto the saw blade. The optional guard or shield as above described also supplements the safety feature of the guide member itself. Moreover, the guide member which extends outwardly from the backing member as well as the shield provide provide maximum protection from flying scraps, particles or chips. The chances of a kickback, due to binding because of stresses in the wood or poor feedthrough by the operator, are minimized. The partially sawed wood strikes the guide member and goes no further.

The duplicating fence can be attached to a conventional table saw having a standard rip saw fence in less than one minute. Basically, attention must be given to the height of the saw blade, the angle of the saw blade, the height of the guide member, and the location of the rip saw fence. To clear the saw table of scraps, or to ready the table saw for conventional sawing, the duplicating fence need only be removed from the saw fence.

Once the set up is completed, all that is required is to keep a pattern overlying and fixed to a workpiece to be cut, snug against the guide edge portion of the guide member and to push it along in a straight line past the saw blade. If this has not been accomplished, repeated passes can be made. If the piece being sawed is to be enlarged or reduced relative to the pattern size, one need only off-set the saw fence from the original position as this results in a displacement of the guide edge portion relative to the saw blade.

Accuracy is also achieved using my novel duplicating fence. If the original pattern positioned over the workpiece is accurate in every respect, the duplicated parts will be equally accurate. If a cupboard door, for example, is binding because of a two degree missalignment, a straight edge as the pattern can be fastened along the two degree line and the resulting tapered hindrance can be sawn off. If another half of a degree is required to completely rectify the situation, one can simply repeat the foregoing operation. This type of fine adjustment is very difficult to achieve with conventional methods on either a standard table or radial arm saw.

The speed with which a sawing operation is accomplished can depend on several factors. The conventional way of sawing on a table saw would be most practical for sawing, say, up 12 pieces, 15 inches square out of an 8×4 sheet of plywood. However, to produce, say, 12 trapezoids out of 10 or 12 scrap pieces, would result in a very different situation. Here the duplicating fence of my invention would hasten the procedure as it will in other cutting operations as discussed below.

DETAILED DESCRIPTION OF DRAWINGS

In the accompanying drawings which illustrate one representative working embodiment of my invention:

Figure 1:
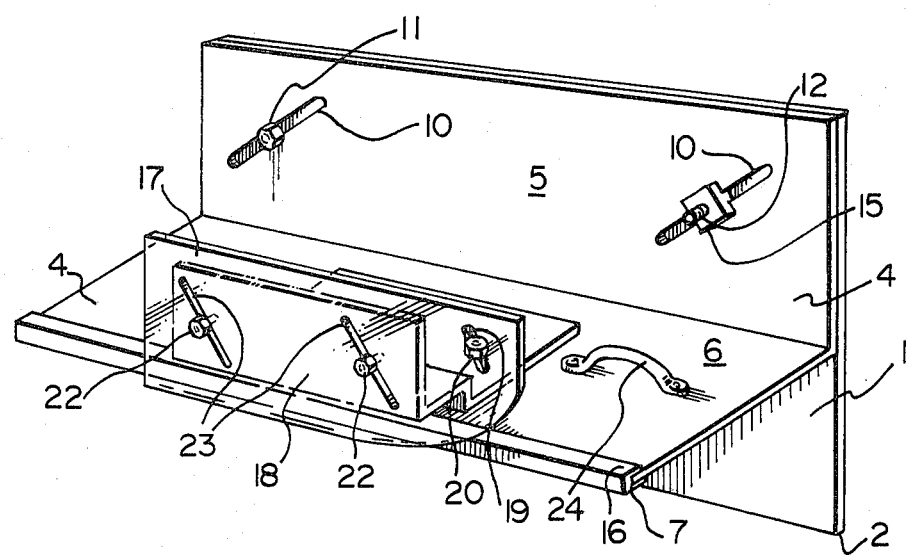
FIG. 1 is a front prospective view of a duplicating fence constructed in accordance with my invention and which includes a saw guard thereon.
Figure 2:
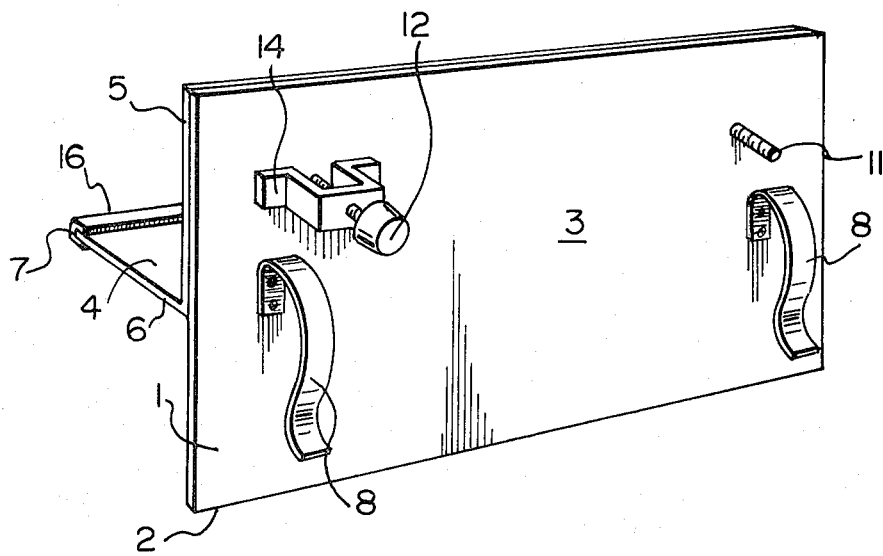
FIG. 2 is a rear prospective view of the duplicating fence of FIG. 1 which also illustrates the attaching and supporting means for securing same to a rip saw fence of a table saw.

Referring to FIGS. 1 and 2, the duplicating fence illustrated comprises a rectilinear backing plate 1 which includes a elongate and straight horizontal bottom edge portion 2 and a vertical and straight rear wall portion 3. The guide member 4 as illustrated includes a first elongate plate section 5 and perpendicular thereto a second elongate plate section 6 which extends outwardly therefrom and which at its outermost free end terminates at a straight vertical side guide edge 7 best seen in FIG. 1 and which is illustrated in broken line. Vertical side guide edge 7 lies in a plane parallel to rear wall plate 3 of backing member 1 and in a plane perpendicular to the straight horizontal bottom edge portion 2 of member 1 for reasons which will be apparent as discussed herein below.

In order to attach the duplicating fence to a rip saw fence of a table saw (not shown in FIGS. 1 and 2) suitable attaching and supporting means are employed for fixing the duplicating fence to the rip saw fence. As illustrated in FIG. 2, this comprises two spaced apart and aligned clips 8 which are intended to quickly and conveniently fixedly engage the duplicating fence so that rear wall portion 3 abuts the duplicating fence.

Figure 3:
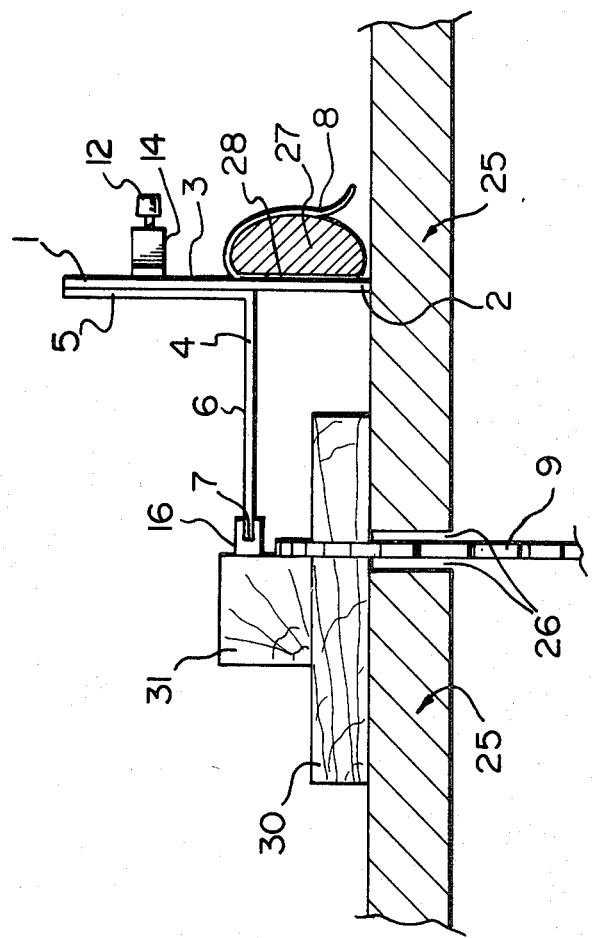
FIG. 3 is a cross-sectional end view of a portion of a table top of a table saw, its circular saw blade and rip saw and also illustrates a workpiece and overlying pattern when passed through the saw during a typical cutting operation.

As also will be apparent from that which follows, the guide member 4 and more particularly the vertical side guide edge portion 7 thereof should be positioned in a plane over the circular saw 9 as seen in FIG. 3. It is well known in the art that the circular saw, relative to the table top 3 of a table saw can be raised and lowered and also angulated, which may necessitate a commensurate raising or lowering of guide member 4. To this end, and as best illustrated in FIGS. 1 and 2, adjustable locking means for raising and lowering the guide 4 relative to the backing member 1 is shown and in this instance comprises spaced apart and parallel diagonal slots 10 extending through plate 5 which itself is in abutting relationship to backing member 1. Threaded screw bolt 11 functioning as a guide pin extends through one of slots 10. The other of slots 10 is provided with knob and threaded screw bolt 12 which extends through and is supported on the rear wall portion 3 of backing member 1 by bracket 14 as best seen in FIG. 2 and which, on its other side, as seen in FIG. 1, extends through slot 10 and is attached to plate 5 by means of threaded attachment to T-shaped guide bolt 15. Merely by loosening knob 12, guide member 4 can be raised and lowered relative to edge 2 with bolts 11 and 12 functioning as guide pins for slots 10 and simply snugly fastened at any desired position whilst in alignment with edge 2 upon tightening knob screw 12.

In order to protect the circular saw 9 from contacting plate 6, particularly where the latter is made out of metal, and as seen in FIG. 1, a protective guide strip can be positioned over vertical side guide edge 7 and which additionally imparts to the outer most free edge of second plate 6 an increased vertical contact extent which is to be engaged by a pattern or the like; the guide strip being generally indicated at 16.

In certain applications where the circular saw 9 may be outboard of edge 7 or guide strip 16 if employed, a saw guide or shield can also be advantageously attached for safety purposes. This is best seen in FIG. 1 where a right-angled support plate 18 is positioned on the top of plate 6 and which is made inwardly and outwardly adjustable relative to edge 7 utilizing diagonal and parallel slots 19 (only one being shown) with screw bolt 20 and knob screw (not shown) configured in a manner similar to that discussed in connection with the adjustability of guide plate 4 and which is thus not described in further detail.

Saw guide or shield 17 which in this particular illustration is constructed from clear plastic material and is in parallel alignment with edge 7 and supported in this position by being attached to the vertical extent of support plate 18. Screw bolts 22 extend through diagonal and parallel slots 23 in shield 17 and are fastened to plate 18 as illustrated. As upwardly directed pressure from below is experienced on shield 17, it is caused to move upwardly and rearwardly since screw bolts 22 function as guiding pins. If desired, a handle 24 may also be positioned on the top surface of plate section 6 in order to facilitate removal of the duplicating fence from its attachment to the rip saw fence of a table saw.

Referring now to FIG. 3, table top 25 of a conventional table saw is shown. Positioned in slot 26 and extending upwardly therethrough is circular saw blade 9. Also shown is rip saw fence 27 that includes a vertical face 28. Rear wall portion 3 of backing plate 1 abuts face 28 with clips 8 serving so as to attach and fixedly support the duplicating fence thereto. As will be seen in this particular illustration, backing plate 1, while aligned with saw 9, is set back relative thereto, so that work piece 30 which is to be cut and which is located below plate 6 and the uppermost extent of saw blade 9, can pass therethrough. Attached to work piece 30 using any suitable attachment means (not shown) is pattern 31.

In operation, pattern 31 is initially brought into registry with guide strip 16 and whilst still in registry therewith is passed over circular saw 27 thereby, and as indicated in this particular illustration, cutting work piece 30 along a vertical line in direct parallel to pattern 31 positioned thereabove.

While not illustrated in the drawings, it will be apparent to any craftsman skilled in the art that the duplicating fence of my invention can be used in the following operational examples:

Truing an Edge

A common method of producing a straight edge on a piece of material (work piece) that is either bowed, broken, chipped, etc. is to plane or joint the edge repeatedly until the irregularities are removed. Besides being tedious and time consuming, the process requires skill and a machine or tool of the appropriate type. The duplicating fence of my invention simplifies the procedure. A suitable straight member functioning as pattern 31, e.g., a straight strip of plywood, is fastened at the line to be sawed. Guide strip 31 of the duplicating fence will abut and guide the straight member so as to produce a cut on the work piece that will remove the waste.

Duplicating Awkward Shapes

The conventional procedure for sawing a polygon shaped article such as a triangle would be to start with material (a work piece) that has a straight edge, determine and set the miter gauge for the two angles, and if a hold down device is not used, hope for a shape that resembles the desired triangle. This procedure can be further complicated by the limitations of the miter gauge to 45 degrees, plus shapes that are too large or too small to manipulate with a miter guage. To saw any shape, from a triangle to one that has dozens of sides, becomes simple with my duplicating fence. Having the shape drawn and roughly precut to oversize, one fastens a straight member 31 along each line and proceeds to saw. Once the first polygon is done, it now functioning as a pattern 31, is fastened to a work piece and used for sawing any number of identical pieces. The original (worn, damaged, broken) member of a piece of furniture, for example, often serves as a pattern for producing an exact replacement.

Chamfering

A tilted circular saw blade, especially if the existing saw guard of a table saw is used, may be crowded against its rip saw fence leaving little or no room for a push stick when chamfering edges of materials. Chamfering the ends of short pieces with a miter gauge alone requires an extension. Different widths and lengths of stock require resetting of the saw fence or a stopping device on the miter guage. With my duplicating fence, and more particularly, by offsetting edge 7 or strip 16 if such is included, relative to the saw blade 27, in a predetermined amount, pieces of various lengths and widths may be chamfered without varying the fence setting. A miter gauge is recommended to help guide narrow pieces in chamfering the ends.

Simple and Compound Miters

A miter gauge alone becomes an inefficient tool when attempting to miter the end of a long or wide piece of material. Often a radial arm saw does not have the capacity to saw across the entire width of wide material. Also, the slightest bit of sawdust between the stock and the radial arm fence can alter the angle considerably.

With my duplicating fence, mitering can be simple and accurate. If the stock or workpiece is sawed to oversided length, a straight member is fastened along a line which will be the point of the miter. With the blade 9 tilted and the rip saw fence 27 carrying the duplicating fence offset a predetermined amount, miters on wide or awkwardly long stock can be cut.

Squaring Ends or Sawing Angles

To square an end or saw an angle across a wide piece of material, e.g., 24 inches, with a miter gauge may be difficult because the miter gauge must be reversed for part of the cut or pulled almost completely out of the table slot when starting the cut. The longer the material, the more difficult the task becomes. A straight member functioning as pattern 31 fastened along a cutting line and sawed with my duplicating fence will ensure much greater accuracy. Trimming a door to length with the correct miter to match a doorstep, is just one example where my duplicating fence has proven very effective.

Tapering

One method of producing tapers of a short length workpiece is to employ a tapering jig. This is an awkward device which requires precise calculations and setting. It is difficult to hold the material and the jig down, against the fence, and to push it forward at the same time. To make tapers of any length or a scrap joint for joining two or more pieces to produce a long member using my duplicating fence, a straight member is fastened on a cutting line marked on the work piece and sawed as before. Ends of rafters can be sawn this way.

Trimming Protruding Ends or Edges of Assembled Projects

In items such as pallets or crates, for example, the covering material may be of oversized (rough) lengths and widths. After the assembling is completed, these protruding sections can be trimmed flush with the remainder of the article using my duplicating fence.

What I claim is:

1. A duplicating fence for use as an attachment to a rip saw fence of a table saw that includes a table top and a circular saw extending upwardly therethrough, said duplicating fence comprising, in combination:
   (a) a backing member which includes an elongate and straight horizontal bottom edge portion and a vertical and straight rear wall portion;
   (b) a guide member which is disposed on a side opposite said rear wall portion of said backing member and which extends outwardly therefrom and which includes an elongate and straight vertical side guide edge portion which is parallel to said rear wall portion and perpendicular to said bottom edge portion; and
   (c) attaching and supporting means for fixedly attaching said rear wall portion of said backing member in abutting relationship to said rip saw fence and for supporting said vertical side guide edge portion in a horizontal plane above said circular saw.

2. The duplicating fence as claimed in claim 1 further including adjustable locking means cooperating with said backing member and said guide member for raising and lowering said vertical side guide edge portion of said guide member relative to said bottom edge portion of said backing member.

3. The duplicating fence as claimed in claim 2 wherein said backing member comprises a elongate plate and said guide member includes a first elongate plate section one side face of which is in abutment with said side opposite said rear wall portion and a second elongate plate section which is perpendicular to said first plate section.

4. The duplicating fence as claimed in claim 3 wherein said first and second plate sections are, in cross-section, L-shaped.

5. The duplicating fence as claimed in claim 4 further including a protective guide strip positioned over said vertical side guide edge portion.

6. The duplicating fence as claimed in claim 4 further including saw blade guard means on said second elongate plate section.

7. The duplicating fence as claimed in claim 1 wherein said attaching and supporting means comprises at least two inverted and spaced apart U-shaped clips on said rear wall portion.

8. The duplicating fence as claimed in claim 2 wherein said adjustable locking means comprises at least two diagonal and parallel slots in one of said backing member and said guide member and a corresponding number of guide pins on the other of said back member and said guide member which extend through said slots, at least one of said pins further including threaded means for locking said backing member to said guide member.

* * * * *